(12) United States Patent
Zeng et al.

(10) Patent No.: US 10,896,315 B2
(45) Date of Patent: Jan. 19, 2021

(54) DISPLAY APPARATUS AND FINGERPRINT IDENTIFICATION METHOD

(71) Applicant: SHANGHAI TIANMA MICRO-ELECTRONICS CO., LTD., Shanghai (CN)

(72) Inventors: Yang Zeng, Shanghai (CN); Lihua Wang, Shanghai (CN); Haochi Yu, Shanghai (CN); Liang Xie, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 265 days.

(21) Appl. No.: 15/952,429

(22) Filed: Apr. 13, 2018

(65) Prior Publication Data

US 2019/0236325 A1    Aug. 1, 2019

(30) Foreign Application Priority Data

Jan. 29, 2018    (CN) .......................... 2018 1 0082075

(51) Int. Cl.
*G06K 9/00* (2006.01)
(52) U.S. Cl.
CPC ........... *G06K 9/001* (2013.01); *G06K 9/0004* (2013.01); *G06K 9/0008* (2013.01)
(58) Field of Classification Search
CPC ..... G06K 9/001; G06K 9/0004; G06K 9/0008
See application file for complete search history.

(56) References Cited

U.S. PATENT DOCUMENTS 5,040,223 A * 8/1991 Kamiya ................. G07C 9/257
                                                          382/127
10,157,590 B1 * 12/2018 Aflatooni ........... G06K 9/00013
(Continued)

FOREIGN PATENT DOCUMENTS

CN        1664847 A      9/2005
CN      100520821 C      7/2009

OTHER PUBLICATIONS

Google Scholar Search Results.*

*Primary Examiner* — Qun Shen
(74) *Attorney, Agent, or Firm* — Anova Law Group PLLC

(57) ABSTRACT

A display apparatus and a fingerprint identification method are provided. An exemplary display apparatus includes a display region including a fingerprint identification region; a plurality of fingerprint identification pixels disposed in the fingerprint identification region and configured to provide a fingerprint identification light; a fingerprint identification array including fingerprint sensing units disposed in the fingerprint identification region and configured to receive the fingerprint identification light after being reflected by a touching body; and a controller electrically connected to the fingerprint sensing units and configured to obtain a whole image of a to-be-identified fingerprint, determine position coordinates of characteristic points on the display apparatus according to the whole image, control a first number of the fingerprint identification pixels to emit light according to the position coordinates to obtain local images at characteristic points of the to-be-identified fingerprint, and identify the to-be-identified fingerprint according to the local images.

19 Claims, 10 Drawing Sheets

(56) References Cited

U.S. PATENT DOCUMENTS

| | | | |
|---|---|---|---|
| 2007/0258629 A1* | 11/2007 | Bartsch | G06K 9/00067 |
| | | | 382/128 |
| 2010/0220900 A1* | 9/2010 | Orsley | G06F 3/044 |
| | | | 382/124 |
| 2013/0004031 A1* | 1/2013 | Abiko | G06K 9/00026 |
| | | | 382/124 |
| 2017/0124370 A1* | 5/2017 | He | G06K 9/0002 |
| 2018/0114047 A1* | 4/2018 | Kim | G06K 9/00026 |
| 2018/0151122 A1* | 5/2018 | Ding | G06K 9/00993 |

* cited by examiner

DISPLAY APPARATUS AND FINGERPRINT IDENTIFICATION METHOD

CROSS-REFERENCES TO RELATED APPLICATIONS

This application claims priority of Chinese Patent Application No. 201810082075.7, filed on Jan. 29, 2018, the entire contents of which are hereby incorporated by reference.

FIELD OF THE INVENTION

The present disclosure generally relates to the field of display technology and, more particularly, relates to a display apparatus and a fingerprint identification method thereof.

BACKGROUND

Fingerprint is the unique natural pattern of ridges on tips of human fingers. With the continuous development of science and technologies, a plurality of display apparatuses, such as cell phones, tablets, and smart wearable apparatus, etc., which have the function of fingerprint identification, have been developed. Before operating a display apparatus having the function of fingerprint identification, a user only has to touch the display apparatus using a finger to perform an authority verification. Thus, the authority verification process is simplified.

An existing display panel having the function of fingerprint identification often has a plurality of light-emitting units and a plurality of fingerprint sensing units. The fingerprint sensing units are able to identify a fingerprint according to the reflective light formed by the light emitted from the light-emitting units after being reflected by a touching body. During the fingerprint identification process, the reflective light at different positions may have a cross-talk, the accuracy of the fingerprint identification process of the display apparatus may be significantly affected. At the same time, various issues, such as dry-finger issue, also affects the signal quality of the fingerprint identification process, and the accuracy of the fingerprint identification process of the display apparatus may be further degraded.

Thus, a display apparatus and a fingerprint identification method capable of increasing the accuracy of the fingerprint identification process of the display apparatus are highly desired. The disclosed display apparatus and fingerprint identification method are directed to solve one or more problems set forth above and other problems in the art.

BRIEF SUMMARY OF THE DISCLOSURE

One aspect of the present disclosure provides a display apparatus. The display apparatus includes a display region including a fingerprint identification region and a non-display region surrounding the display region; a plurality of fingerprint identification pixels, disposed in the fingerprint identification region and configured to provide fingerprint identification light; a fingerprint identification array including a plurality of fingerprint sensing units, disposed in the fingerprint identification region and configured to receive the fingerprint identification light after being reflected by a touching body; and a controller electrically connected to the plurality of fingerprint sensing units. The controller is configured to obtain a whole image of a to-be-identified fingerprint; determine a position coordinate of at least one characteristic point of the to-be-identified fingerprint on the display apparatus according to the whole image; control a first number of the plurality of fingerprint identification pixels to emit light to obtain a local image at the at least one characteristic point of the to-be-identified fingerprint according to the position coordinate; and identify the to-be-identified fingerprint according to the local image. The first number of the plurality of fingerprint identification pixels is smaller than a total number of the plurality of fingerprint identification pixels.

Another aspect of the present disclosure provides a fingerprint identification method for a display apparatus comprising a display region including a fingerprint identification region, a non-display region surrounding the display region, and a plurality of fingerprint identification pixels disposed in the fingerprint identification region and configured to provide fingerprint identification light. The fingerprint identification method comprising obtaining a whole image of a to-be-identified fingerprint; determining position coordinates of characteristic points of the to-be-identified fingerprint on the display apparatus according to the whole image; according to the position coordinates, controlling a first number of the plurality of fingerprint identification pixels to emit light to obtain local images at the characteristic points of the to-be-identified fingerprint; and identifying the to-be-identified fingerprint according to the local images.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
FIG. 1 illustrates exemplary characteristic points of a fingerprint consistent with various disclosed embodiments.

Reference will now be made in detail to exemplary embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure. Further, in the present disclosure, the disclosed embodiments and the features of the disclosed embodiments may be combined under conditions without conflicts.

For the techniques, methods and apparatus that are familiar to the persons of ordinary skill in the art may not be described in detail. However, under appropriate conditions, such techniques, methods and apparatus are included as the parts of the description.

In the disclosed embodiments, the specific values should be explained for illustrative purposes only, and should not be used as limitations. Thus, some other embodiments may have different values.

Further, the similar symbols and letters in the drawings denote similar elements. Thus, once one element is defined in one drawing, it may not need to be defined in the following drawings.

The present disclosure provides a display apparatus with improved fingerprint identification accuracy. The display apparatus may include a display region disposed with a fingerprint identification region, and a plurality of fingerprint sensing units and a plurality of fingerprint identification pixels may be disposed in the fingerprint identification region. The fingerprint identification light provided by the fingerprint identification pixels may be reflected by a touching body and then reach the fingerprint sensing units. A controller of the display apparatus may be connected to the fingerprint sensing units. The fingerprint may be identified according to the light received by the fingerprint sensing units.

In particular, in the disclosed embodiments, a whole image/an entire image of a to-be-identified fingerprint may be obtained by the controller. Then, the position coordinates of the characteristic points of the to-be-identified fingerprint may be determined by according to the whole image. Then, the local images at the characteristic points of to be-identified fingerprint may be obtained by controlling fingerprint identification pixels to emit light according to the position coordinates. At last, the fingerprint may be identified according to the local images.

Usually, two fingerprints have same general characteristics. The total characteristics of the fingerprints, such as ridge shapes, pattern area, core, delta and ridge count, etc., can be directly observed by human eyes. However, the detailed characteristics of the fingerprints are different. The ridges of the fingerprints are not continuous, smooth and straight, instead often have crossovers, bifurcations, or ridge endings. The crossovers, bifurcations or ridge endings are named as the characteristic points of the fingerprint or fingerprint characteristic points.

Figure 2:
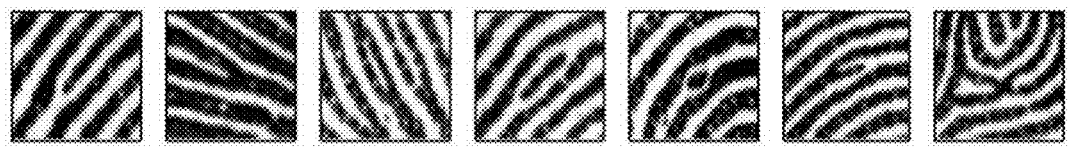
FIG. 2 illustrates exemplary local images consistent with various disclosed embodiments.

FIG. 1 illustrates a plurality of fingerprint characteristic points consistent with various disclosed embodiments. As shown in FIG. 1, from left to right, the characteristic points of the fingerprint may include but not be limited to ending ridge, bifurcation, enclosure, short ridge, island, spur and ridge crossing. FIG. 2 illustrates a plurality of local images consistent with various disclosed embodiments. As shown in FIG. 2, from left to right, the images correspond to the local images of characteristic points of the fingerprint in FIG. 1.

The fingerprint characteristic points representing the characteristics of the fingerprint are able to provide unique identification information of the fingerprint. By identifying the characteristic points of the fingerprint, an identification of the fingerprint may be achieved. In the disclosed embodiments, acquiring the whole image of the fingerprint may be used to determine the positions of the characteristic points of the fingerprint. The image containing the detailed information of the characteristic points of the fingerprint may be obtained by the local images at the characteristic points.

Comparing with the existing technology that directly obtains the information of the characteristic points using the whole image, the effects of the dry finger and crosstalk issues, etc. on the accuracy of the fingerprint identification process may be reduced. Further, during acquiring the local images, the local light source and the image acquiring mode may be specifically adjusted. Thus, the fingerprint identification accuracy of the display apparatus may be further increased.

The above description is only the general principle of the present disclosure. Reference will now be made in detail to exemplary embodiments of the disclosure, which are illustrated in the accompanying drawings. The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure.

Figure 3:
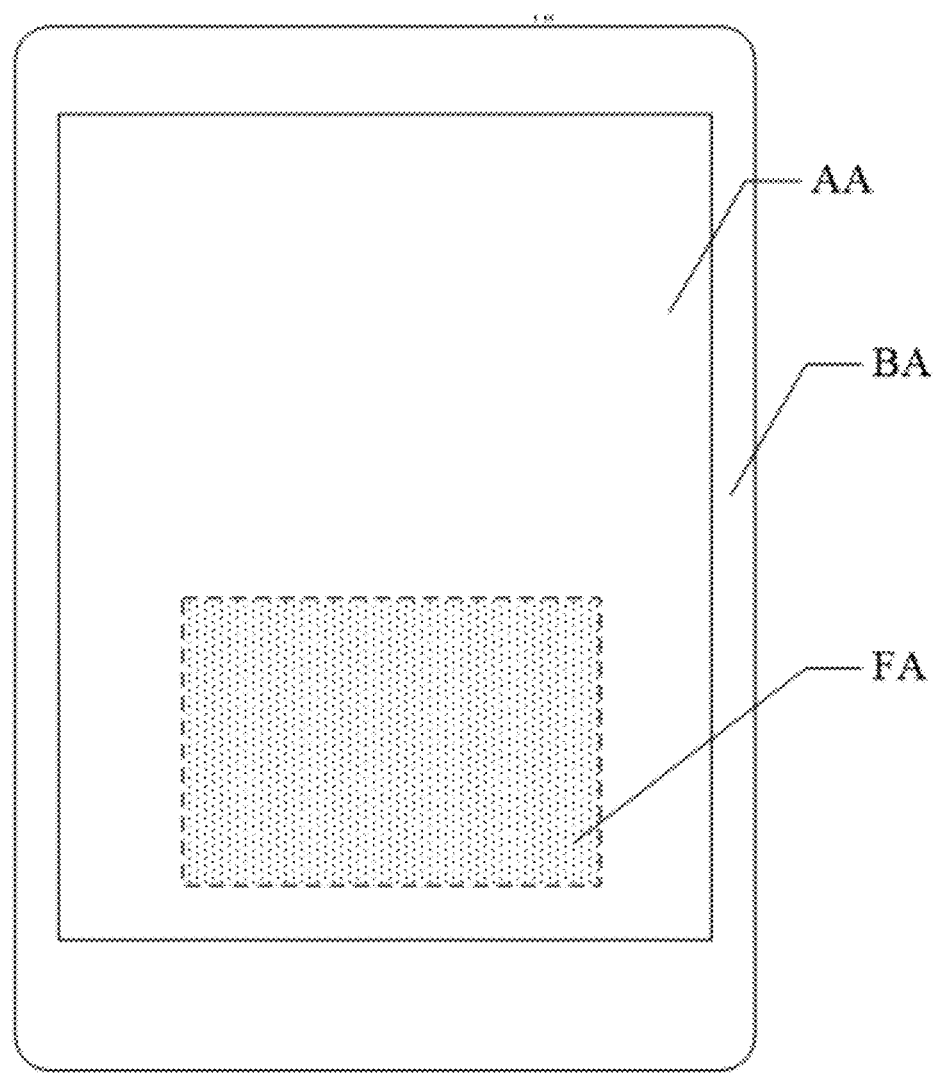
FIG. 3 illustrates a top view of an exemplary display apparatus consistent with various disclosed embodiments.

FIG. 3 illustrates an exemplary display apparatus consistent with various disclosed embodiments. As shown in FIG. 3, the display apparatus may include a display region AA and a non-display region BA surrounding the display region AA. Display pixels (not shown) for displaying images may be disposed in the display region AA, to achieve a normal display function of the display apparatus. The display region AA may include a fingerprint identification region FA. The size and the shape of the fingerprint identification region FA are not limited by the present disclosure.

In one embodiment, as shown in FIG. 3, the fingerprint identification region FA may be a portion of the display region AA. In another embodiment, the fingerprint identification region FA may be an entire display region AA. The shape of the fingerprint identification region FA may be circular, triangular, square, or irregular, etc., which is not limited by the presented disclosure. When a touching body of the user (such as a finger) touches a portion of the fingerprint identification region AA, the display apparatus may perform a fingerprint identification. In the disclosed embodiments, the fingerprint identification refers to a generalized fingerprint identification, which includes a special fingerprint identification, and the identification of the skin ridges of a palm, etc.

Figure 4:
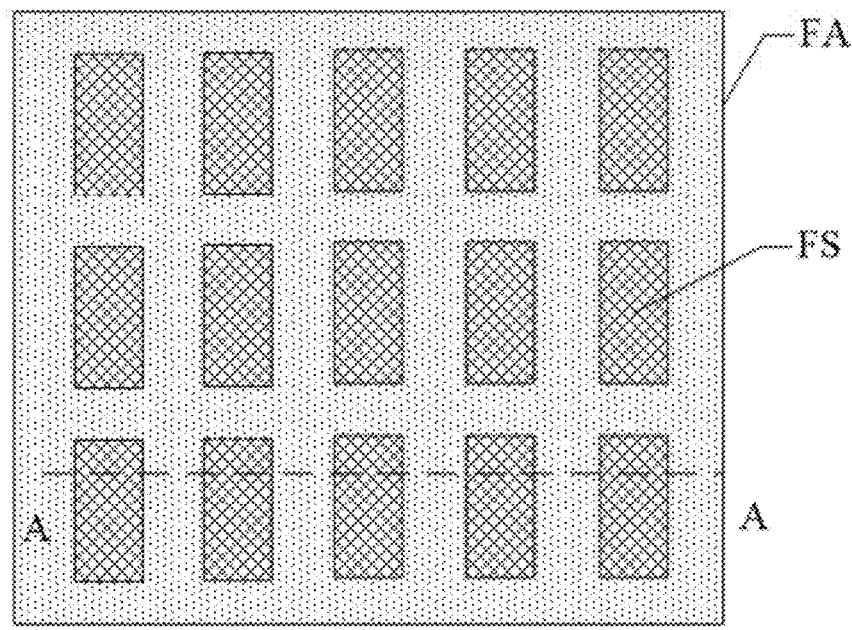
FIG. 4 illustrates an enlarged image of a fingerprint identification region in an exemplary display apparatus in FIG. 3.

In one embodiment, as shown in FIG. 3, a square-shaped region in the display region AA may be used as the fingerprint identification region FA. FIG. 4 illustrates an enlarged image of a fingerprint identification region in an exemplary display apparatus in FIG. 3; and FIG. 5 illustrates an A-A-sectional view of an exemplary display apparatus in FIG. 4.

Figure 5:
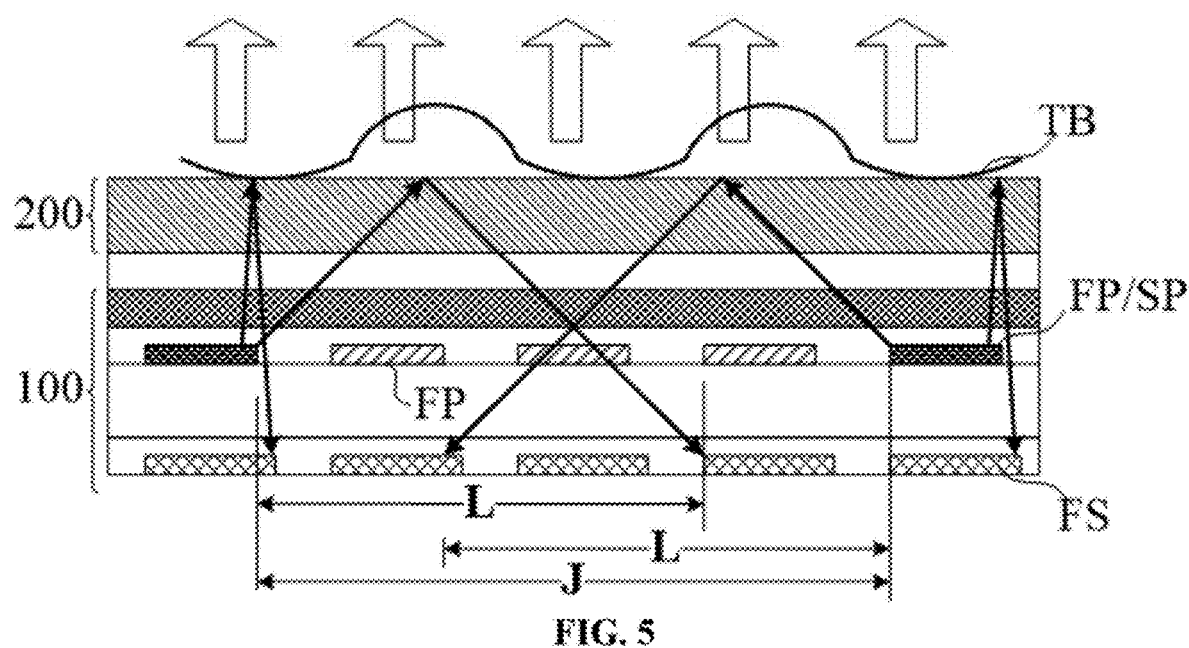
FIG. 5 illustrates an A-A-sectional view of an exemplary display apparatus in FIG. 4.

As shown in FIG. 4 and FIG. 5, the display apparatus may include a display panel 100 and a cover plate 200 disposed on the display panel 100. A touching body TB may contact with a first surface of the cover plate 200. A plurality of fingerprint identification pixels FP and a fingerprint identification array (not labeled) including a plurality of fingerprint sensing units FS may be disposed in the fingerprint identification region FA. The fingerprint identification pixels FP may provide fingerprint identification light. The light provided by the fingerprint identification pixels FP may be incident onto the touching body TB; and may be reflected back to the fingerprint sensing units FS.

In one embodiment, the plurality of the fingerprint identification pixels FP may be formed by multiplexing the display pixels during the fingerprint identification process. That is, the display pixels may be used as the fingerprint identification pixels FA during the fingerprint identification process. In another embodiment, the plurality of fingerprint identification pixels FP may be the pixels which are disposed in the fingerprint identification region FA and independent from the display pixels. The fingerprint identification pixels FP may provide the light. In another embodiment, certain fingerprint identification pixels FP may be formed by multiplexing the display pixels during the fingerprint identification process, and certain other fingerprint identification pixels FP may be the pixels capable of emitting light and independent from the display pixels.

For illustrative purposes, FIG. 5 only shows the layer having the fingerprint sensing units FS, the layer between the fingerprint identification pixels FP and the fingerprint sensing units FS, and the layer between the fingerprint identification pixels FP and the touching body TP. The layer having the fingerprint sensing units FS, the layer between the fingerprint identification pixels FP and the fingerprint sensing units FS, and the layer between the fingerprint identification pixels FP and the touching body TP may be single-layer structures, or multiple-layer structures. The specific layer structure of the display apparatus is not limited by the present disclosure.

Further, the display apparatus may include a controller (not shown). In one embodiment, the controller may be integrated in a control chip of the display panel of the display apparatus. In another embodiment, the controller may be a controller independent from the control chip of the display panel. The controller may be electrically connected to the plurality of fingerprint sensing units FS, and form a fingerprint image according to the reflective light received by the fingerprint sensing units FS.

Figure 6:
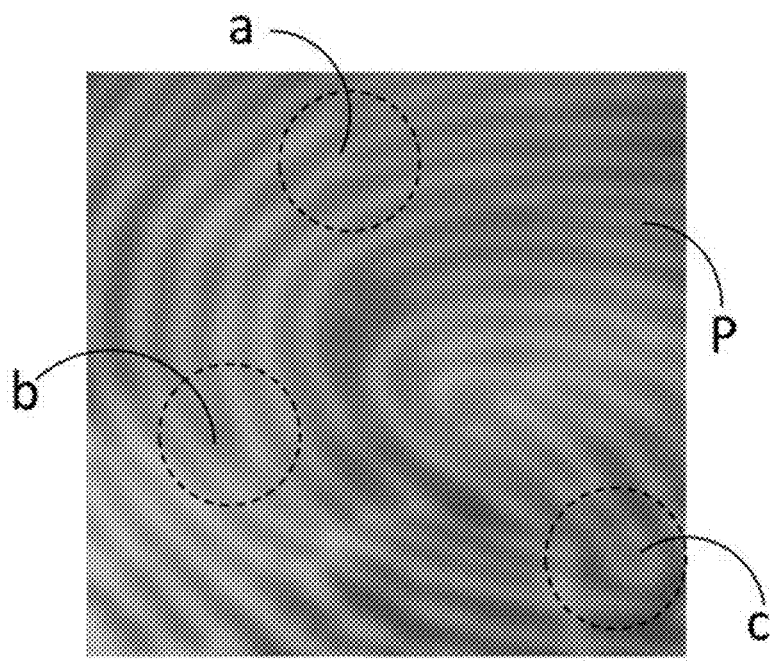
FIG. 6 illustrates an exemplary whole image of a to-be-identified fingerprint obtained by an exemplary display apparatus consistent with various disclosed embodiments.

FIG. 6 illustrates an exemplary whole image of a to-be-identified fingerprint obtained by the disclosed display apparatus. Referring to FIG. 3-FIG. 6, the controller may obtain a whole image P of the to-be-identified fingerprint first. In one embodiment, the whole image P may be obtained by lighting up/turning on the fingerprint identification pixels FP in the entire pixel identification region FA. In another embodiment, the whole image P may be obtained by controlling another light source. For example, the whole picture P may be obtained by lighting up an external light source of the display panel.

No matter which method is used to obtain the whole image P, after acquiring the whole image P, an image processing may be performed on the whole image P. At the same time, by combining the sample images of fingerprints stored in the displayer apparatus, the whole image P may be compared with the whole characteristics of the sample images of the fingerprint to obtain the position coordinates of the characteristic points of the to-be-identified fingerprint on the display apparatus.

Figure 7:
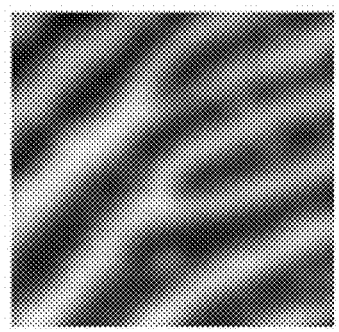
FIG. 7-FIG. 9 illustrates exemplary local images of exemplary disclosed display apparatus consistent with various disclosed embodiments.
Figure 8:
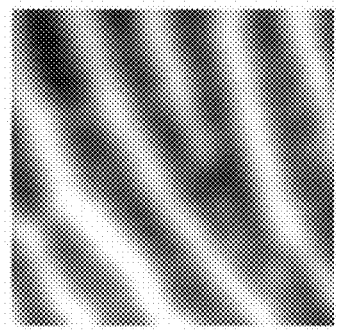
Figure 9:
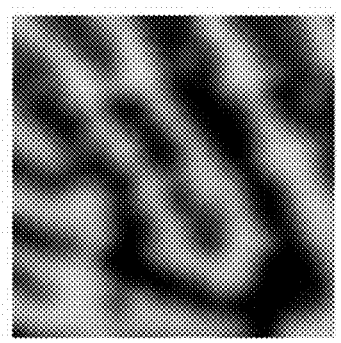

For example, as shown in FIG. 6, the position coordinates of the characteristic points a, b and c on the display apparatus may be referred to as $(X_a, Y_a)$, $(X_b, Y_b)$ and $(X_c, Y_c)$, respectively. Then, the fingerprint pixels FP may be controlled to emit light according to the position coordinate $(X_a, Y_a)$ to obtain a local image of the fingerprint at the characteristic point a. The fingerprint pixels FP may be controlled to emit light according to the position coordinate $(X_b, Y_b)$ to obtain a local image of the fingerprint at the characteristic point b. The fingerprint pixels FP may be controlled to emit light according to the position coordinate $(X_c, Y_c)$ to obtain a local image of the fingerprint at the characteristic point c. FIG. 7-FIG. 9 illustrates exemplary local images of the disclosed display apparatus. As shown in FIG. 7-FIG. 9, the local images of the display apparatus at the characteristic points a, b and c are sequentially obtained. After obtaining the local images at the characteristic points, the to-be-identified fingerprint may be identified according to the local images at the characteristic points.

In the disclosed embodiments, during the fingerprint identification, the whole image of the fingerprint may be obtained first, and the positions of the characteristic points of the fingerprint may be identified according to the whole image. Then, the fingerprint identification pixels may be controlled to emit light to obtain the local images of the characteristic points of the fingerprint, and the detailed information of the characteristic points of the fingerprint may be obtained according to the local images. Thus, through using the local images to perform the fingerprint identification process, the effects of the dry finger issues and the crosstalk of the light, etc., on the accuracy of the fingerprint identification may be reduced. Thus, the accuracy of the fingerprint identification may be improved.

In the disclosed display apparatus, when obtaining a local image, the controller may control the fingerprint identification pixels to emit light according to the determined position coordinates. Certain exemplary methods to control the fingerprint identification pixels to emit light are explained below.

Figure 10:
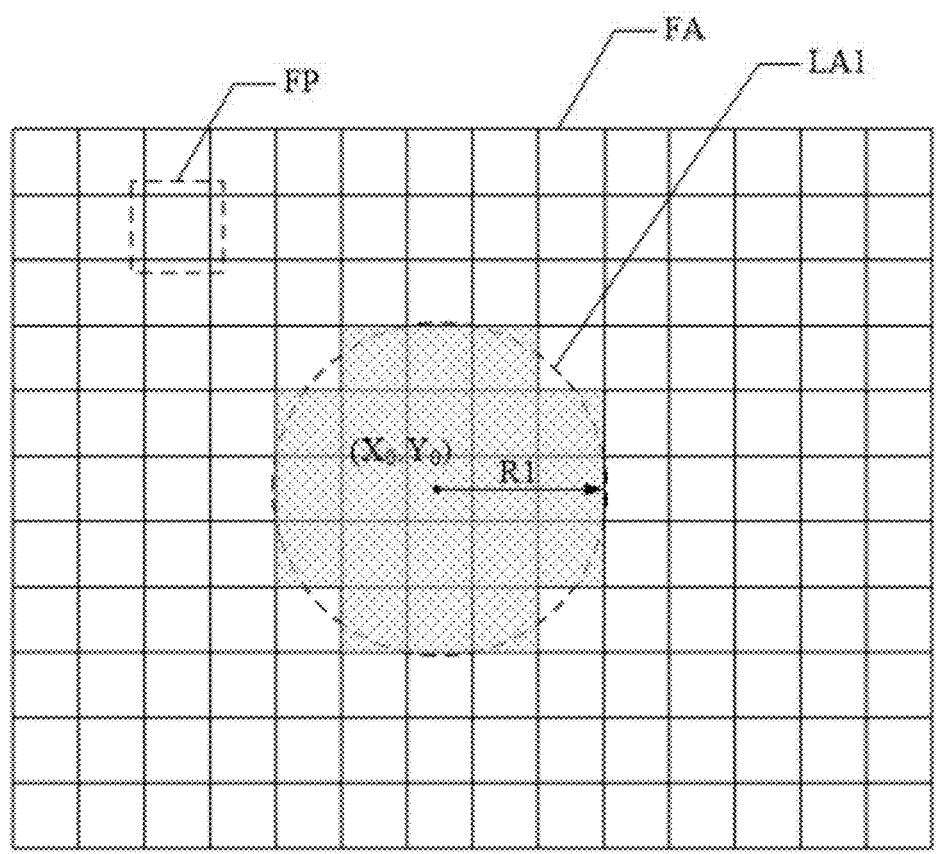
FIG. 10 illustrates an exemplary light-emitting process of fingerprint identification pixels of an exemplary display apparatus consistent with various disclosed embodiments.

FIG. 10 illustrates an exemplary light-emitting process of a fingerprint identification pixels of an exemplary display apparatus consistent with various disclosed embodiments. As shown in FIG. 10, when the controller controls the fingerprint identification pixels to emit light according to the position coordinate ($X_0$, $Y_0$) of a certain characteristic point of the fingerprint, a first light-emitting region LA1 corresponding to the position coordinate ($X_0$, $Y_0$) may be determined first. The first light-emitting region LA1 may be a portion of the fingerprint identification region FA; and may cover the point determined by the position coordinate ($X_0$, $Y_0$). After determining the first light-emitting region LA1, the controller may control the fingerprint identification pixels FP in the first light-emitting region LA1 to emit light. The point-filled fingerprint identification pixels FP illustrated in FIG. 10 are the light-emitting fingerprint identification pixels FP.

In particular, the parameters of the first light-emitting region LA1, such as shape, and size, etc., may be preset in a control program of the controller. The shape of the first light-emitting region LA1 may be circular, polygonal, elliptical, or irregular, etc. The size of the first light-emitting region LA1 may be defined by the number of the fingerprint identification pixels FP. The shape of the first light-emitting region LA1 may be determined according to the characteristics of the fingerprint characteristic points. For example, when the fingerprint characteristic point is an enclosure, the shape of the first light-emitting region LA1 may be circular, when the fingerprint characteristic point is a short ridge, the shape of the first light-emitting region LA1 may be rectangular.

In the disclosed embodiment, the shape of the fingerprint identification pixels and the shape of the light-emitting region may not be exactly the same. Thus, the edges of the fingerprint identification pixels FP and the boundary line of the light-emitting region may not necessarily overlap. When determining which fingerprint identification pixels FP are going to emit light, the fingerprint identification pixels FP having a total area larger than the preset area may be used as the fingerprint identification pixels FP to emit light.

Referring to FIG. 10, when the preset area is set as one half of the area of the total area of the fingerprint identification pixels FP, the fingerprint identification pixels FP disposed in the first light-emitting region LA1 and having an area greater than the preset area may be used as the fingerprint identification pixels FP to emit light. That is, for one fingerprint identification pixel, when the area of the fingerprint identification pixel in the first light-emitting region is greater than the area of the fingerprint identification pixel outside the light-emitting region, the fingerprint identification pixel may be identified as a fingerprint identification pixel to emit light.

In the disclosed embodiments, the local images may be obtained by only lighting up the fingerprint identification pixels in the region having the characteristic points of the fingerprint. Thus, the effect of the light crosstalk in an outside region, i.e., the region outside the region having the characteristic points of the fingerprint, may be reduced, the accuracy for the local images at the characteristic points to provide the characteristic information of the fingerprint may be improved, and the fingerprint identification accuracy of the display apparatus may be enhanced.

Further, in one embodiment, referring to FIG. 10, the first light-emitting region LA1 is a circular region. The center of the circuit region is ($X_0$, $Y_0$). The radius of the circle region may be a first preset threshold value R1.

In the disclosed display apparatus, the first light-emitting region may be set as a circular region. Thus, the detailed information from all the directions of the position coordinate of the characteristic point of the fingerprint may be obtained, and the control method may be substantially simple.

Figure 11:
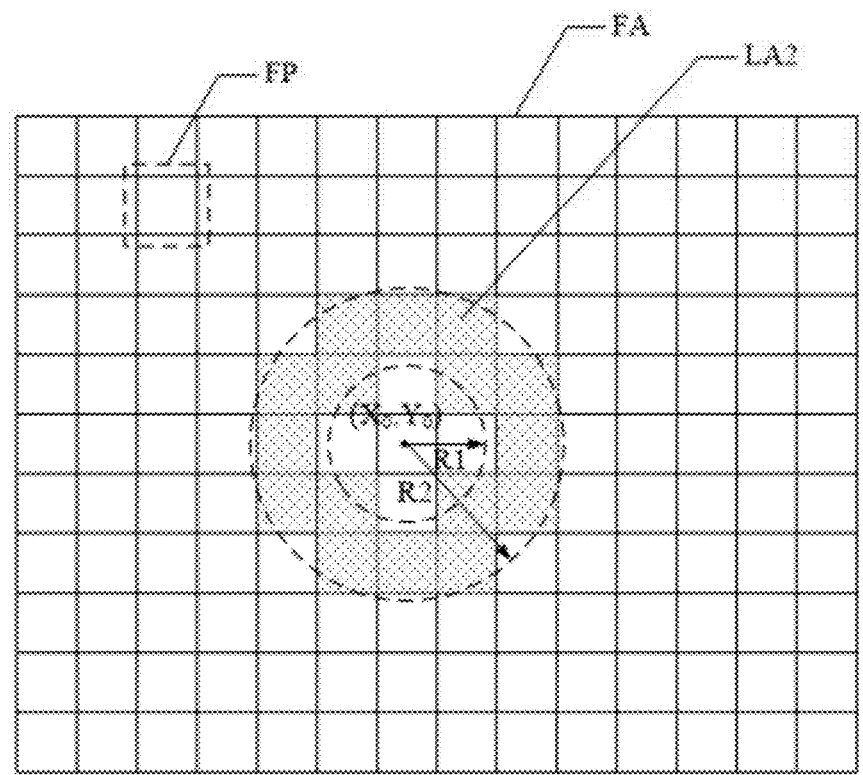
FIG. 11 illustrates another exemplary light-emitting process of fingerprint identification pixels of an exemplary display apparatus consistent with various disclosed embodiments.

FIG. 11 illustrates another exemplary light-emitting process of the fingerprint identification pixels of an exemplary display apparatus consistent with various disclosed embodiments. As shown in FIG. 11, when the controller controls the fingerprint identification pixels to emit light according to the position coordinate ($X_0$, $Y_0$) of a certain characteristic point of the fingerprint, a second light-emitting region LA2 corresponding to the position coordinate ($X_0$, $Y_0$) may be determined first. The second light-emitting region LA2 may be a portion of the fingerprint identification region FA; and may surround the point determined by the position coordinate ($X_0$, $Y_0$). That is, the point determined by the position coordinate ($X_0$, $Y_0$) may be outside of the second light-emitting region LA2. After determining the second light-emitting region LA2, the controller may control the fingerprint identification pixels FP in the second light-emitting region LA2 to emit light. The point-filled fingerprint identification pixels FP illustrated in FIG. 11 are the light-emitting fingerprint identification pixels FP.

The parameters of the second light-emitting region LA2, such as shape, and size, etc., may be preset in a control program of the controller. The shape of the second light-emitting region LA2 may be circular, ring, polygonal, elliptical, or irregular, etc. The size of the second light-emitting region LA2 may be defined by the number of the fingerprint identification pixels FP.

In the disclosed display apparatus, the fingerprint identification pixels at the characteristic point of the fingerprint may not emit light, while the fingerprint identification pixels in the region surrounding the fingerprint characteristic point may emit light. The light emitted from the fingerprint identification pixels in the region surrounding the fingerprint characteristic point may be incident into the touching body; and may be reflected inside the touching body. The reflected light from the touching body may be incident on the fingerprint sensing units FS. Comparing with the method that utilizes the light emitted from the fingerprint identification pixels at the fingerprint characteristic point and reflected by the surface of the touching body to be incident on the fingerprint sensing units FS, the dry finger issue during the fingerprint identification may be reduced. Thus, the accuracy for the local image at the fingerprint characteristic point to provide the characteristic information of the fingerprint may be improved; and the fingerprint identification accuracy of the display apparatus may be enhanced.

Further, in one embodiment, referring to FIG. 11, the second light-emitting region LA2 is a ring region. The center of the ring region may be at the position coordinate ($X_0$, $Y_0$). The inner radius of the ring region may be a first preset threshold value R1; and the outer radius of the ring region may be a second preset threshold value R2.

In the disclosed display apparatus, the fingerprint identification pixels in the region surrounding the characteristic point of the fingerprint may emit light. The dry finger issue may be reduced. At the same time, the light incident onto the touching body corresponding to the characteristic point may be generated from all the directions of the position coordinate of the fingerprint characteristic point. Thus, the detailed information of the fingerprint from all the directions of the position coordinate of the characteristic point may be obtained. Further, the controller may control a partial number of the fingerprint identification pixels to emit light. Thus, the power-consumption of the fingerprint identification may be reduced.

Figure 12:
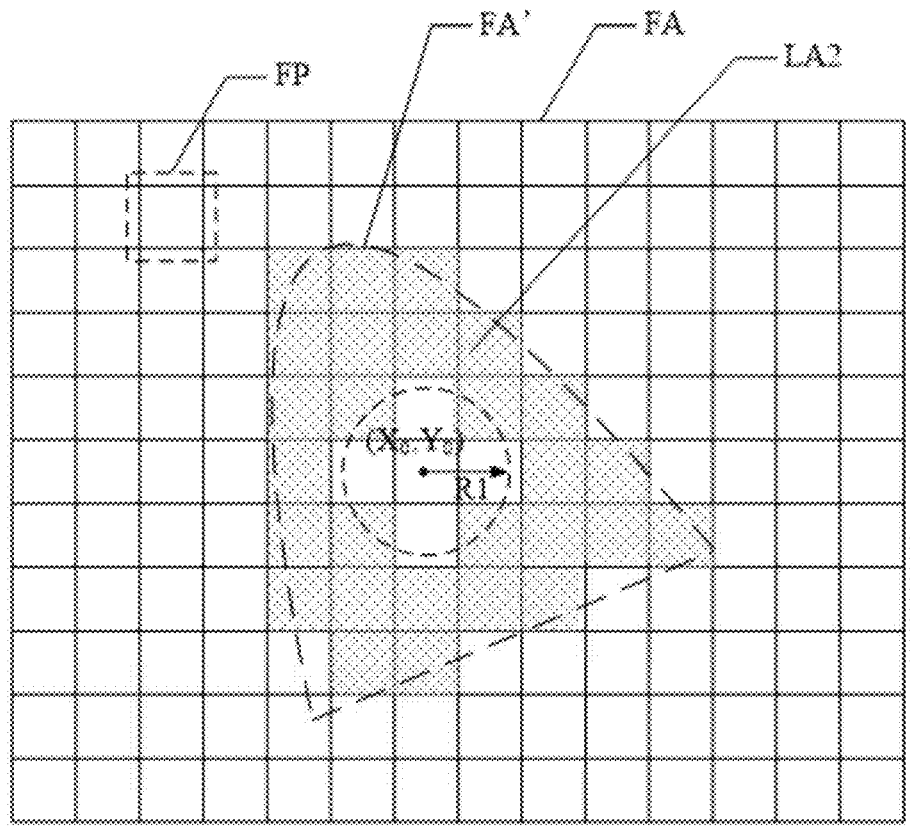
FIG. 12 illustrates another exemplary light-emitting process of fingerprint identification pixels of an exemplary display apparatus consistent with various disclosed embodiments.

Further, FIG. 12 illustrates another exemplary light-emitting process of the fingerprint identification pixels of an exemplary display apparatus consistent with various disclosed embodiments. As shown in FIG. 12, in the fingerprint region FA, the region having the whole image may be referred to as a fingerprint region FA'. The second light-emitting region LA2 may be a region within the fingerprint region FA' but excluding the circular region having a center of the position coordinate $(X_0, Y_0)$ and the radius of a first preset threshold value "R1".

In the disclosed display apparatus, after obtaining the whole image, the fingerprint region FA' and the position coordinate $(X_0, Y_0)$ of the fingerprint characteristic point may be determined. Accordingly, the second light-emitting region LA2 may be determined. The controller may control the fingerprint identification pixels in the region surrounding the characteristic point and in the fingerprint region FA' to emit light. On one hand, the light incident onto the touching body corresponding to the characteristic point of the fingerprint may be generated from all the directions of the position coordinate of the fingerprint characteristic point; and the detailed information of the fingerprint may be obtained from all the directions of the position coordinate of the fingerprint characteristic point. On the other hand, the fingerprint identification pixels emitting light may all be disposed within the fingerprint region FA'. Thus, a major portion of the light emitted from the fingerprint identification pixels may be incident onto the touching body; and may be reflected inside the touching body. Accordingly, the utilization ratio of the fingerprint identification light may be increased.

Figure 13:
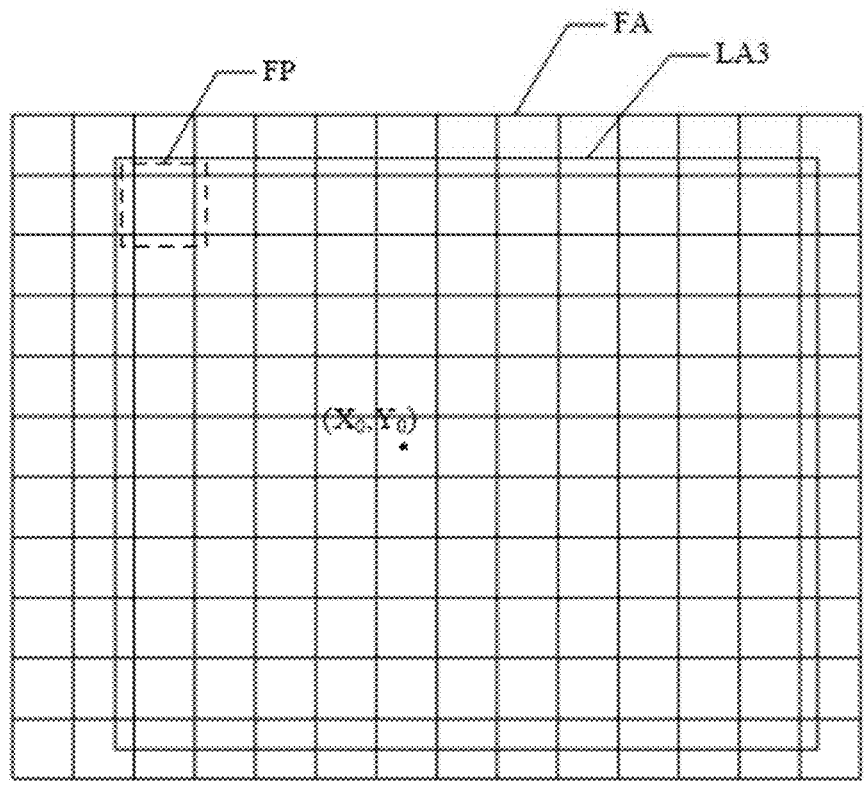
FIG. 13 illustrates another exemplary light-emitting process of fingerprint identification pixels of an exemplary display apparatus consistent with various disclosed embodiments.

FIG. 13 illustrates another exemplary light-emitting process of fingerprint identification pixels of an exemplary display apparatus consistent with various disclosed embodiments. As shown in FIG. 13, when the controller controls the fingerprint identification pixels to emit light according to the position coordinate $(X_0, Y_0)$ at a certain characteristic point of the fingerprint, a third light-emitting region LA3 corresponding to the position coordinate $(X_0, Y_0)$ may be determined first. The third light-emitting region LA3 may be a portion of the fingerprint identification region FA; and may surround the position coordinate $(X_0, Y_0)$. In one embodiment, the third light-emitting region LA3 is a portion of the fingerprint identification region FA; and may cover the point determined by the position point $(X_0, Y_0)$.

Figure 14:
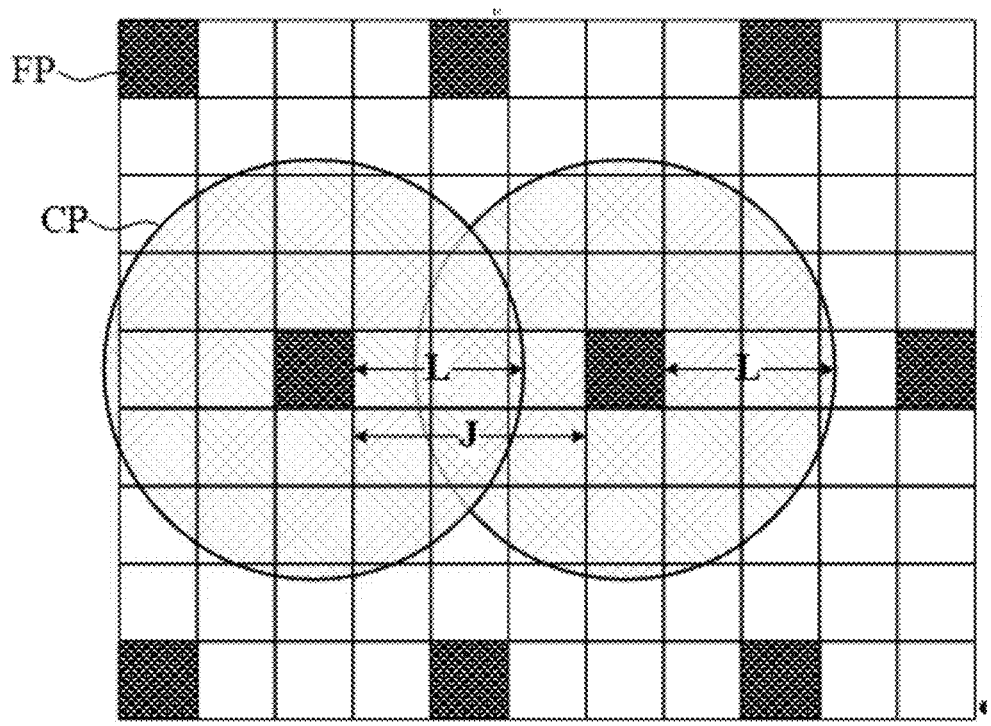
FIG. 14 illustrates an exemplary enlarged image of an exemplary fingerprint identification region in an exemplary display apparatus in FIG. 13.
Figure 15:
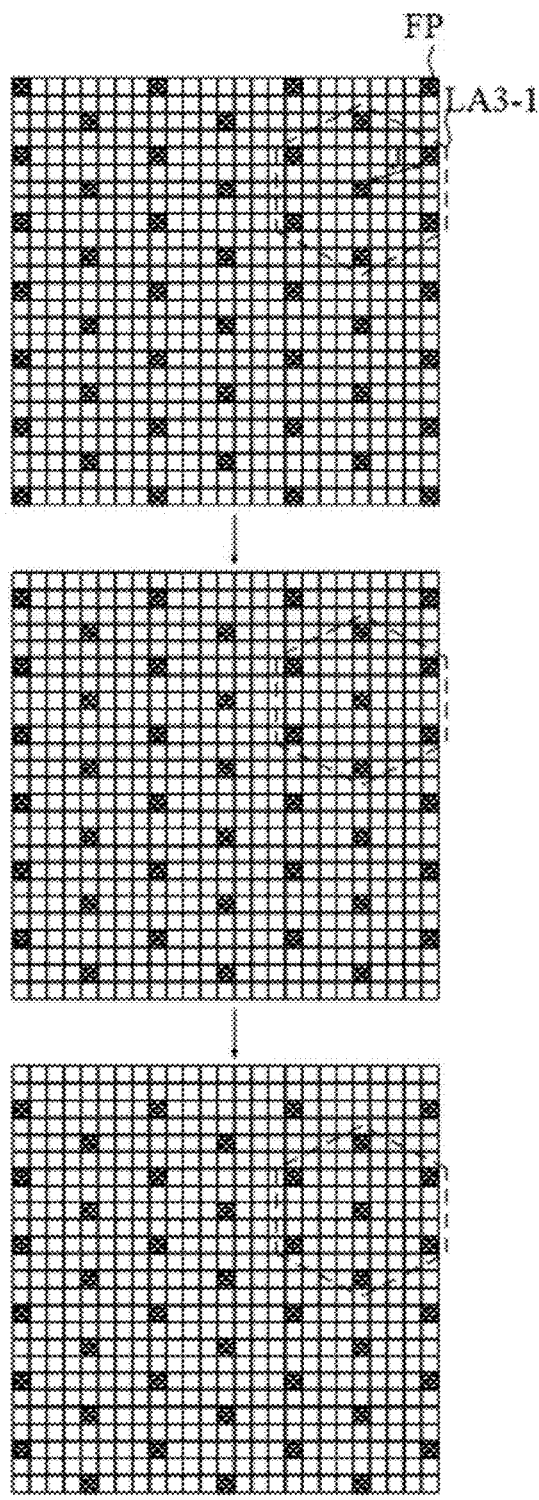
FIG. 15 illustrates an exemplary scanning process of a fingerprint identification stage of an exemplary display apparatus consistent with various disclosed embodiments.

FIG. 14 is an enlarged view of an exemplary fingerprint identification region in an exemplary display apparatus illustrated in the FIG. 13. FIG. 15 illustrates a scanning process of a fingerprint identification process of the disclosed display apparatus. As shown in FIG. 5, FIG. 14, and FIG. 15, after determining the third light-emitting region LA3, the controller may control the fingerprint identification pixels FP in the third light-emitting region LA3 to emit light according to a bit shift of a first point matrix LA3-1. The distance J between any two adjacent fingerprint identification pixels FP may be greater than or equal to a minimum no-crosstalk distance L. The minimum no-crosstalk distance L may be referred to as the maximum radius of a covered region on the fingerprint identification matrix formed by the light emitted from any fingerprint identification pixel and reflected by the touching body. As shown in FIG. 5 and FIG. 14, the light emitting from the fingerprint identification pixels FP may have angular distribution. Thus, the light emitted from the fingerprint identification pixels FP may form a covered region CP on the fingerprint identification array after being reflected by the first surface of the cover plate 200. The fingerprint reflected light from all the angles of the light emitted from the fingerprint identification pixels FP may all fall within the covered region CP. The fingerprint reflected light may refer to the light reflected by the fingerprint of the user. When the user presses the first surface of the cover plate 200, the fingerprint of the user may reflect the light emitted from the fingerprint identification pixels FP. The maximum radius of the covered region CP may be referred to as the minimum no-crosstalk radius L.

In one embodiment, the distance J between any two adjacent fingerprint identification pixels FP in the first light-emitting point matrix LA3-1 may be greater than or equal to the minimum no-crosstalk distance L. Thus, the fingerprint reflected light of any fingerprint identification pixel FP may always not be incident onto the fingerprint sensing unit FS corresponding to other fingerprint identification pixels "FP" which are emitting light simultaneously. Accordingly, the fingerprint sensing unit corresponding to any fingerprint identification pixel FP in the first light-emitting point matrix LA3-1 may only receive the light emitted from the corresponding fingerprint identification pixel FP. Thus, in the disclosed display apparatus, the fingerprint sensing units FS may not receive the crosstalk signal from other fingerprint identification pixels FP. Correspondingly, the controller of the display apparatus may perform the fingerprint identification according to the sensing signals generated by the fingerprint sensing units FS; and the fingerprint identification accuracy of the display apparatus may be increased.

The fingerprint reflected light may refer to the light reflected by the fingerprint of the user. When the user presses the first surface of the cover plate 200, the fingerprint of the user may reflect the light emitted from the fingerprint identification pixels FP. Comparing with the thickness of the display apparatus, the distance between the fingerprint of the user and the first surface of the cover plate 200 may be substantially small. Thus, the effect of the fingerprint of the user on the area of the covered region CP may be substantially small. Accordingly, in one embodiment, when the minimum no-crosstalk distance L is set, the distance between the finger of the user and the first surface of the cover plate 200 may be omitted. Further, the radius of the covered region CP may be calculated using the center point of the fingerprint identification pixel FP as a primary point. However, the display apparatus may include a large number of fingerprint identification pixels FP. Correspondingly, the size of the fingerprint identification pixels FP may be substantially small. Thus, in the disclosed embodiment, all the fingerprint identification pixels FP together may be considered as the primary point of the cover region CP. Accordingly, the radius L of the covered region "CP" may be referred to as the length between the edge of the fingerprint identification pixels FP and the edge of the covered region CP; and the size of the fingerprint identification pixels FP may not be included into the minimum no-crosstalk distance L.

The minimum no-crosstalk distance L may be related to the thickness of the display apparatus, and the light-emitting angles of the fingerprint identification pixels FP, etc. Thus, different display apparatuses may have different minimum no-crosstalk distances L. In another embodiment, the size of the organic light-emitting structure may be included into the minimum no-crosstalk distance, and it is not limited by the present disclosure.

As shown in FIG. 15, when the controller controls the fingerprint identification pixels FP in the third light-emitting region LA3 to emit light according to the bit shift of the first light-emitting point matrix LA3-1, an exemplary process may be described as below.

The fingerprint identification pixels FP may be lighted up at a same according to the first light-emitting point matrix LA3-1; and the sensing signals generated by the fingerprint sensing units FS corresponding to the lighted up fingerprint identification pixels FP may be recorded. In the following image, the fingerprint identification pixels FP lighted up at the same time may have a bit shift; and the corresponding sensing signals may be recorded. The step for lighting up the pixels and the step for recording the sensing signals may be repeated until all the fingerprint identification pixels "FP" are lighted up. Then, the fingerprint may be identified according to the recorded sensing signals of the fingerprint sensing units FS. Because the fingerprint sensing units FS may not receive the crosstalk signals, the fingerprint identification accuracy of the disclosed apparatus may be sufficiently high.

The first light-emitting point matrix may be selected from the minimum repeating units formed by a plurality of organic light-emitting structures that emit light simultaneously, it is not intended to limit the first light-emitting point matrix to be selected from the point matrix formed by a plurality of organic light-emitting structures that emit light simultaneously. The first light-emitting point matrix may have other appropriate shapes; and is not limited by the present disclosure.

In the disclosed display apparatus, the light used by the controller to obtain the whole image may be provided by a fingerprint identification light source that is independent from the display apparatus. The light may also be provided by the fingerprint identification pixels. Certain exemplary embodiments are described below.

Figure 16:
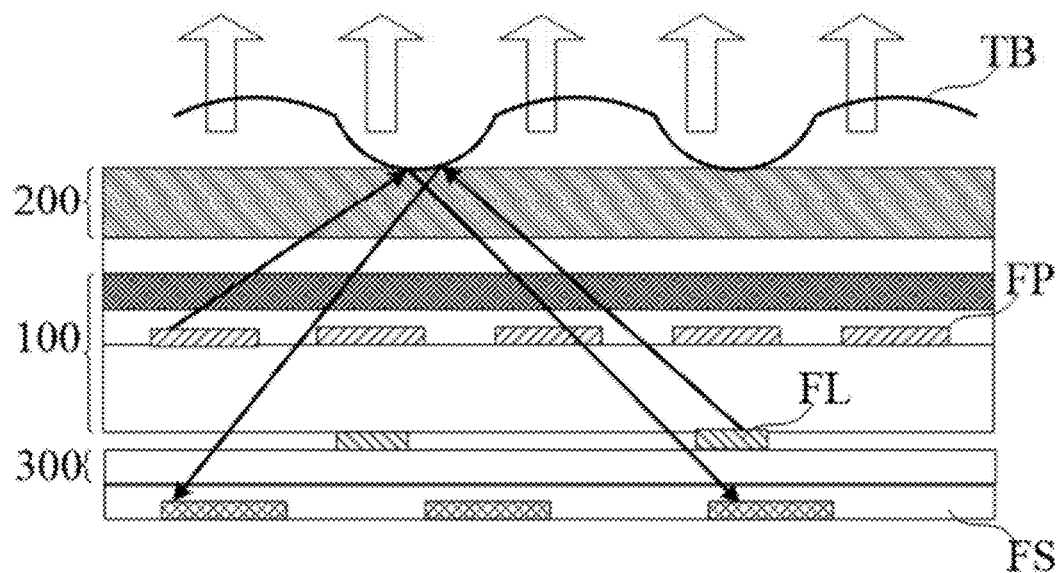
FIG. 16 illustrates a cross-sectional view of another exemplary display apparatus consistent with various disclosed embodiments.

FIG. 16 illustrates a cross-sectional view of another exemplary display apparatus consistent with various disclosed embodiments. As shown in FIG. 16, the display apparatus may include a display panel 100, a cover plate 200, a fingerprint identification substrate 300, a fingerprint identification light source FL, a fingerprint sensing unit FS and a controller (not shown). The display panel 100 may have a light-emitting side and a non-light-emitting side. The fingerprint identification pixels FP may be disposed in the display panel 100; the fingerprint identification substrate 300 may be disposed at the non-light-emitting side of the display panel 100; and the fingerprint identification light source FL may be disposed on a side of the fingerprint identification substrate 300 adjacent to the display panel 100. The fingerprint identification light source FL may provide a fingerprint identification light when the controller is acquiring the whole image of the fingerprint.

In the disclosed embodiment, when the controller is acquiring a whole image, the controller may control the fingerprint identification light source FL to emit light. When acquiring the local images, the controller may control the fingerprint identification pixels FP to emit light.

In another embodiment, as shown in FIG. 5, the display apparatus may not include a specific fingerprint identification light source. During obtaining both the whole image and the local images, the fingerprint identification light may all be provided by the fingerprint identification pixels FP. In one embodiment, when the controller is obtaining the whole image, all the fingerprint identification pixels in the fingerprint identification region may be controlled to emit light. During obtaining the local images, a partial number of the fingerprint identification pixels in the fingerprint identification region may be controlled to emit light. The detailed information may refer to the previous descriptions.

Further, in one embodiment, for the fingerprint identification pixels that emit light during both obtaining the whole image and the local images, the brightness of the fingerprint identification pixels during obtaining the whole image may be smaller than the brightness fingerprint identification pixels during obtaining the local images. Through using a smaller brightness during obtaining the whole image, the power-consumption of the fingerprint identification process may be reduced. Further, through using a larger brightness during obtaining the local images, the definition of the local images may be increased; and the accuracy of the fingerprint identification process may be increased.

Further, in one embodiment, for the fingerprint identification pixels that emit light during both obtaining the whole image and the local images, the time duration for the fingerprint identification pixels to obtain the whole image may be shorter than the time duration for the fingerprint identification pixels to obtain the local images. Through using a shorter time duration during obtaining the whole image, the power-consumption of the fingerprint identification process may be reduced; and the response time of the fingerprint identification may be reduced. Accordingly, the customer experience may be improved. Further, through using a longer time duration during obtaining the local images, the clearness of the local images may be increased; and the accuracy of the fingerprint identification process may be increased.

In the disclosed display apparatus, the fingerprint identification pixels may multiplex the display pixels. The fingerprint identification pixels may be independent from the display pixels; and may be interlaced with the display pixels. Certain exemplary embodiments are described below.

Referring to FIG. 3 and FIG. 5, the display region AA may include a plurality of display pixels SP. The display pixels SP may be used to display images. The display pixels SP may also be multiplexed as the fingerprint identification pixels FP during the fingerprint identification. When the fingerprint identification pixels FP multiplexes the display pixels SP, no extra structure and process are desired to form the fingerprint identification pixels FP. Thus, the production cost and the process requirements may be reduced.

Figure 17:
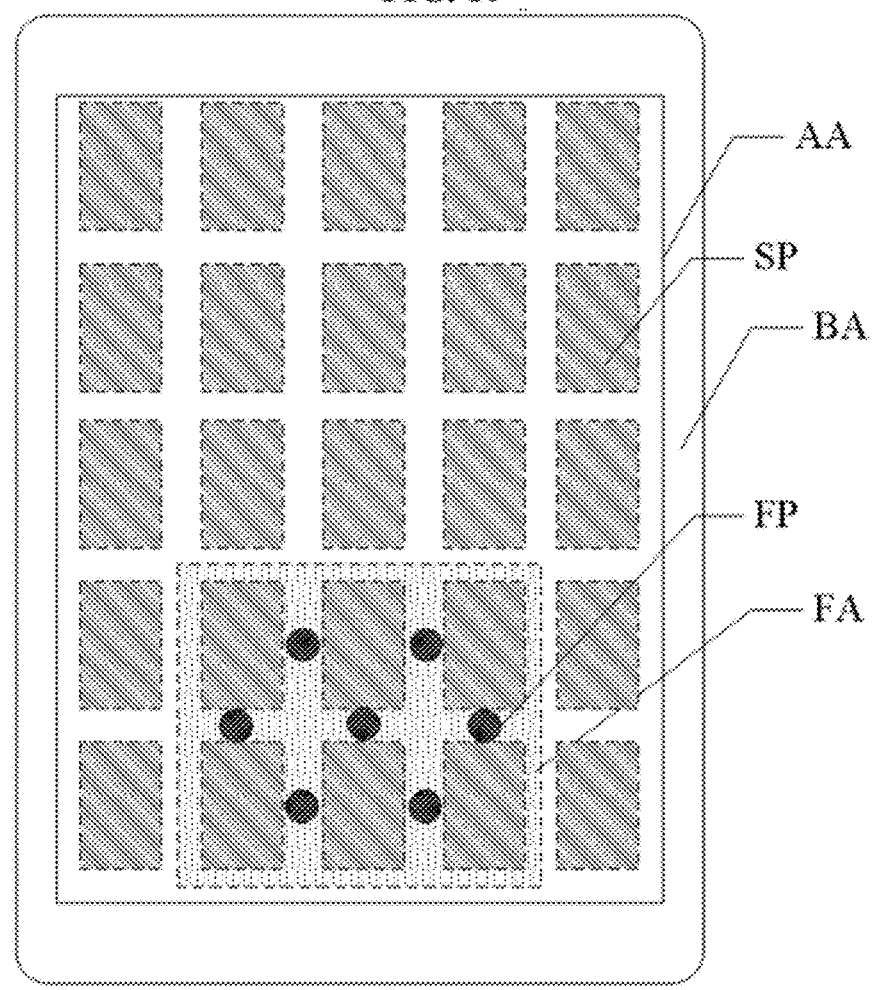
FIG. 17 illustrates a top view of another exemplary display apparatus consistent with various disclosed embodiments.

FIG. 17 illustrates a top view of another exemplary display apparatus consistent with various disclosed embodiments. As shown in FIG. 17, the display region AA may include a plurality of display pixels SP. The plurality of display pixels SP may be used to display images. In the fingerprint identification region FA, the fingerprint identification pixels FP may be interlaced with the display pixels SP; and may not overlap with the display pixels SP. Thus, the fingerprint identification pixels FP may be disposed independent from the display pixels SP. The fingerprint identification pixels FP may be disposed according to the characteristic of the fingerprint identification process to emit light to improve the fingerprint identification accuracy. Further, the fingerprint identification and the display process of the display apparatus may not affect each other. Thus, the fingerprint identification may not occupy the periods of the display process. Accordingly, the user experience may be improved.

Further, in one embodiment, the light generated by the fingerprint identification pixels FP may be an infrared light. The infrared light may have a strong penetration ability; and may not be affected by external light. Thus, the definition of the formed image may be improved.

The disclosed display apparatus may be a liquid-crystal display apparatus, or an organic light-emitting display apparatus. The detailed information of an exemplary liquid-crystal display apparatus and an exemplary organic light-emitting display apparatus are described separately below.

Figure 18:
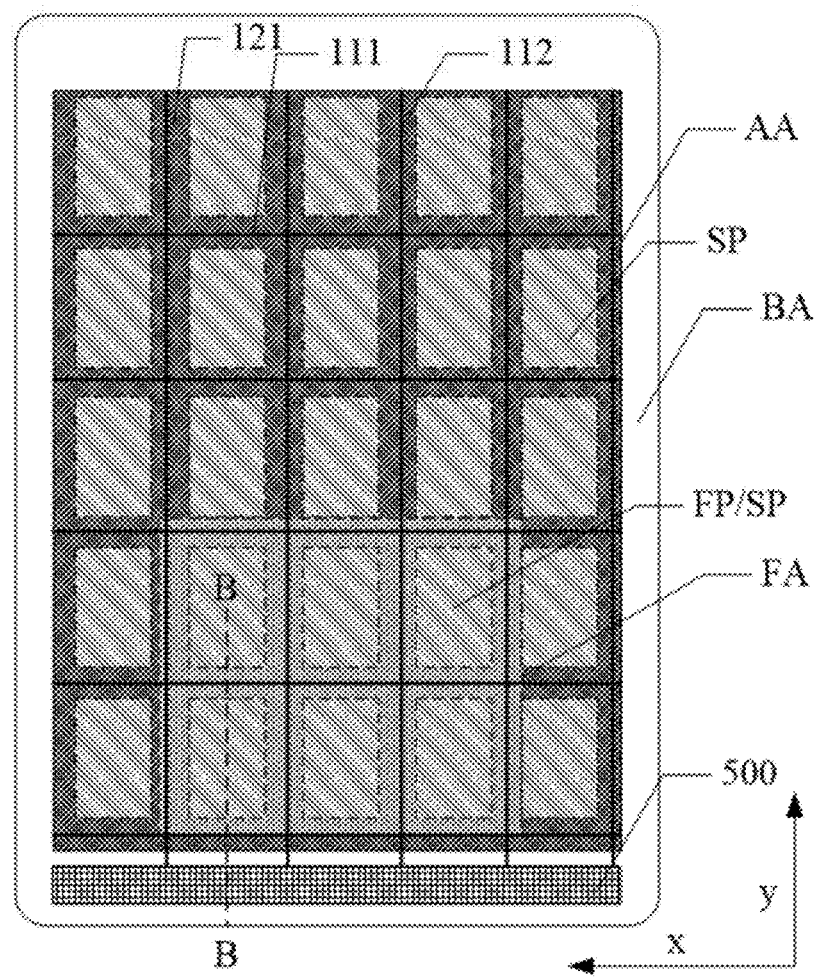
FIG. 18 illustrates a top view of another exemplary display apparatus consistent with various disclosed embodiments.
Figure 19:
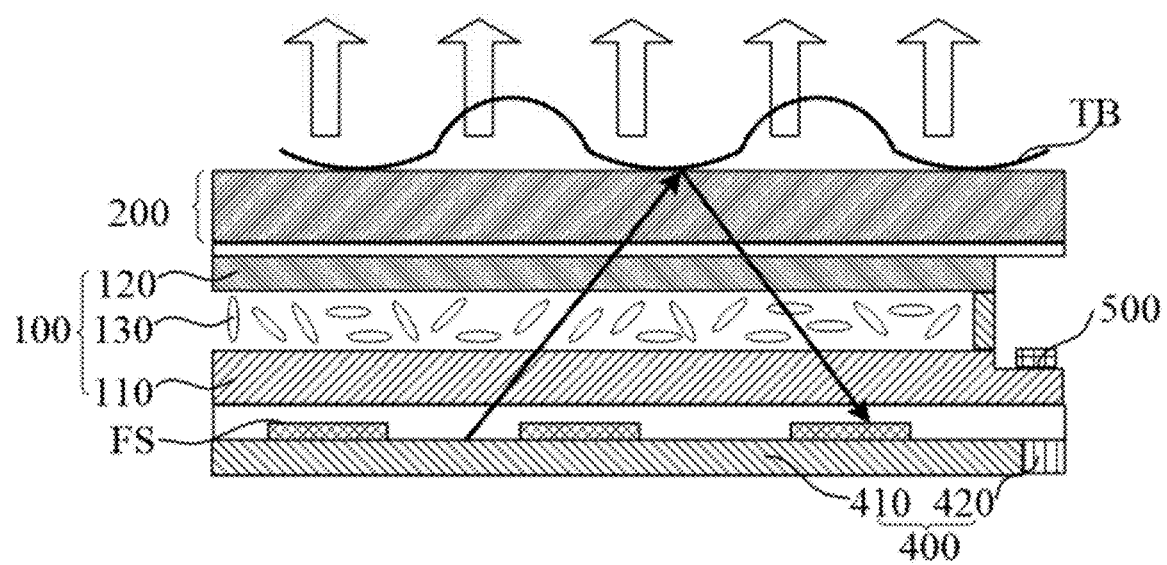
FIG. 19 illustrates a B-B-sectional view of an exemplary display apparatus in FIG. 18.

FIG. 18 illustrates a top view of another exemplary display apparatus consistent with various disclosed embodiments. FIG. 19 is a B-B-sectional view of an exemplary display apparatus in FIG. 18. As shown in FIG. 18 and FIG. 19, the display apparatus may include a display region AA and a non-display region BA. A fingerprint identification region FA may be disposed in the display region AA. The display region AA may include a plurality of display pixels SP. The display apparatus may include a display panel 100, a cover plate 200, a back light module 400, an integrated circuit chip 500 and a plurality of fingerprint sensing units FS. The display panel 100 may include an array substrate 110 and an opposing color film substrate 120, and liquid crystal molecules 130 between the array substrate 110 and the color film substrate. The array substrate 110 may include a glass substrate, and scanning lines 111 extending along a first direction X and data lines 112 extending along the second direction Y disposed on the glass substrate. The scanning lines 111 and the data lines 112 may crossover to define the display pixels SP. The detailed layer structure of the scanning lines 111 and the data lines 112 on the array substrate 110 may be referred to the existing technologies.

Color resistors (not shown) and a black matrix 121 may be disposed on the color film substrate 120. The projection of the black matrix 121 on the array substrate 110 may cover the scanning lines 111 and the data lines 112. The detailed layer structure of the black matrix 121 on the color film substrate 120 may be referred to the existing technologies.

The backlight module 400 may include a light guiding board 410 and a light source 420. The light source 420 may be disposed at one end of the light guiding board 410. The light generated by the light source 420 may be guided into the display panel 100 by the light guiding board 410.

Pixel electrodes (not shown) and thin film transistors (not shown) may be disposed in the display pixels SP. The thin film transistors may be controlled by the scanning lines 111 and the data lines 112. The scanning lines 111 and the data lines 112 may be connected to the integrated circuit chip 500, respectively. A pixel voltage may be applied on the pixel electrodes to deflect (or polarize) the liquid crystal molecules 130. After the liquid crystal molecules 130 are deflected, the light generated by the light source 420 may enter into the display panel 100 guided by the light guiding board 400; and emit from the display pixels SP to the cover plate 200.

All the display pixels SP in the fingerprint identification region FA may be multiplexed as the fingerprint identification pixels. When the display apparatus is obtaining a whole image of a fingerprint, the integrated circuit chip 500 may turn on the thin film transistors of all the display pixels SP in the fingerprint identification region FA to apply a first voltage on the pixel electrodes of all the display pixels SP in the fingerprint identification region FA, and hold for a first time duration. Accordingly, the liquid crystal molecules 130 in all the display pixels SP in the fingerprint identification region FA may be deflected. The light generated from all the positions of the fingerprint display region FA may be used as the fingerprint identification light. The fingerprint identification light may be reflected at the touching body TB; and the reflected light may enter into the fingerprint sensing units FS. The fingerprint sensing units FS may be connected to the integrated circuit chip 500; and the whole image may be obtained according to the light received by the fingerprint sensing units FS.

When the display apparatus is obtaining the local images, the integrated circuit chip 500 may turn on the thin film transistors of a partial number of the display pixels SP in the fingerprint identification region FA to apply a second voltage on the pixel electrodes of the partial number of display pixels SP in the fingerprint identification region FA, and hold for a second time duration. Accordingly, the liquid crystal molecules 130 in the partial number of display pixels SP in the fingerprint identification region FA may be deflected. The light generated from some positions of the fingerprint display region FA may be used as the fingerprint identification light. The fingerprint identification light may be reflected at the touching body TB; and the reflected light may enter into the fingerprint sensing units FS. The fingerprint sensing units FS may be connected to the integrated circuit chip 500; and the local images may be obtained according to the light received by the fingerprint sensing units FS.

In one embodiment, the second voltage may be greater than the first voltage. The second time duration may be longer than the first time duration.

Figure 20:
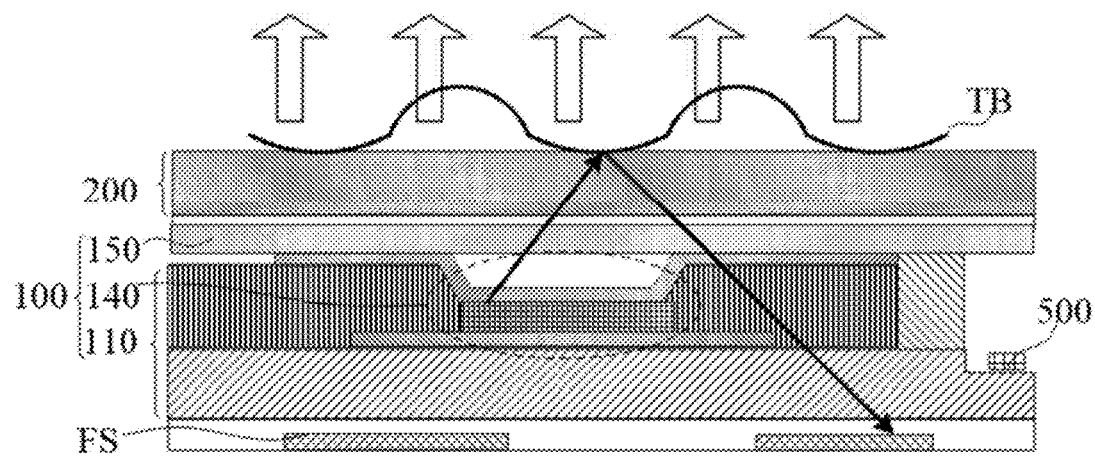
FIG. 20 illustrates another B-B-sectional view of an exemplary display apparatus in FIG. 18.

FIG. 18 also illustrates a top view of another exemplary display apparatus consistent with various disclosed embodiments. FIG. 20 is a B-B-sectional view of an exemplary display apparatus in FIG. 18. The BB-sectional view of the display apparatus in FIG. 20 is different from the BB-sectional view of the display apparatus in FIG. 19. That is, the two display apparatuses may have a same top view, while the B-B-sectional views may be different.

As shown in FIG. 18 and FIG. 20, the display apparatus may include a display region AA and a non-display region BA. A fingerprint identification region FA may be disposed in the display region AA. The display region AA may include a plurality of display pixels SP. The display apparatus may include a display panel 100, a cover plate 200, an integrated circuit chip 500 and a plurality of fingerprint sensing units FS. The display panel 100 may include an array substrate 110, an organic light-emitting device layer 140 disposed on the array substrate 110, and a packaging cover plate 150 packaging the organic light-emitting device layer 140. Scanning lines 111 extending along a first direction X and data lines 112 extending along the second direction Y may be disposed on the array substrate 110. The crossovers of the scanning lines 111 and the data lines 112 may define the display pixels SP. The detailed layer structure of the scanning lines 111 and the data lines 112 on the array substrate 110 may be referred to the existing technologies.

The array substrate 110 may also include a pixel definition layer (not labeled); and the pixel definition layer may have a plurality of openings. An organic light-emitting structure may be disposed in an opening. The organic light-emitting device layer 113 may include a plurality of organic light-emitting structures; and a display pixel "SP" may be formed by a corresponding light-emitting structure. A pixel circuit may be disposed to control a corresponding organic light-emitting structure of the display pixel SP to emit light. The pixel circuit may be controlled by the scanning lines 111 and the data lines 112. The scanning lines 111 and the data lines 112 may be connected to the integrated circuit chip 500.

All the display pixels SP in the fingerprint identification region FA may be multiplexed as the fingerprint identification pixels. When the display apparatus is obtaining a whole image, the integrated circuit chip 500 may control all the display pixels SP in the fingerprint identification region FA to emit light. The light-emitting voltage may be referred to as a first voltage; and the light-emitting time may be referred to as a first time duration. The light generated from all the positions of the fingerprint display region FA may be used as the fingerprint identification light. The fingerprint identification light may be reflected at the touching body TB; and the reflected light may be received by the fingerprint sensing units FS. The fingerprint sensing units FS may be connected to the integrated circuit chip 500; and the whole image may be obtained according to the light received by the fingerprint sensing units FS.

When the display apparatus is obtaining the local images, the integrated circuit chip 500 may control a partial number of the display pixels SP in the fingerprint identification region FA to emit light. The light-emitting voltage may be referred to as a second voltage; and the light-emitting time may be referred to as a second time duration. The light generated from some positions of the fingerprint display region FA may be used as the fingerprint identification light. The fingerprint identification light may be reflected at the touching body TB; and the reflected light may be received by the fingerprint sensing units FS. The fingerprint sensing units FS may be connected to the integrated circuit chip 500; and the local images may be obtained according to the light received by the fingerprint sensing units FS.

In one embodiment, the second voltage may be greater than the first voltage. The second time duration may be longer than the first time duration.

The present disclosure also provides a fingerprint identification method. The fingerprint identification method may be performed by the disclosed display apparatus, or other appropriate display apparatus, or other appropriate apparatus. For illustrative purposes, the disclosed display apparatus illustrated in FIG. 3 is used to describe the disclosed fingerprint identification method.

As shown in FIG. 3, the display apparatus may include a display region AA and a non-display region BA surrounding the display region AA. The display region AA may include a fingerprint identification region FA. A plurality of fingerprint identification pixels may be disposed in the fingerprint identification region FA. The plurality of fingerprint identification pixels may be used to provide a fingerprint identification light.

Figure 21:
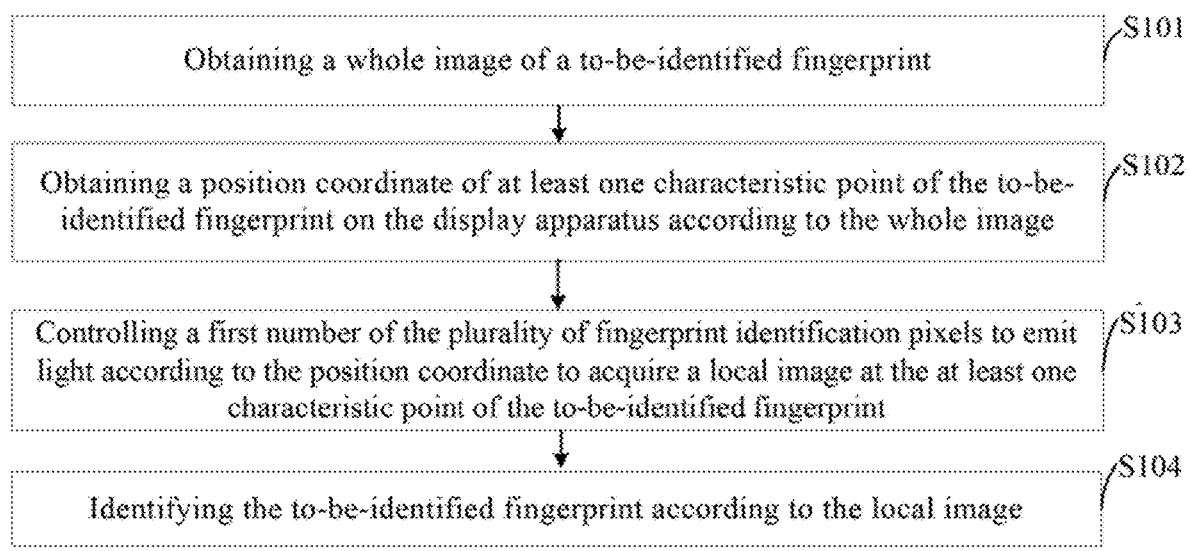
FIG. 21 illustrates a flow chart of an exemplary fingerprint identification method consistent with the disclosed embodiments.

FIG. 21 illustrates a flow chart of an exemplary fingerprint identification method consistent with various disclosed embodiments. As shown in FIG. 21, the fingerprint identification method may include Step S101 to Step S104.

In Step S101, a whole image of a to-by-identified fingerprint may be obtained.

The whole image may be obtained by lighting up the fingerprint identification pixels in the entire fingerprint identification region FA, or by lighting up another light source. For example, the whole image of the fingerprint may be obtained by lighting up an external light source of the display apparatus.

In Step S102, a position coordinate of at least one characteristic point of the to-be-identified fingerprint on the display apparatus may be obtained according to the whole image. After obtaining the whole image, an image processing process may be performed on the whole image. At the same, the whole image may be compared with sample fingerprint images stored in the display apparatus to determine the position coordinate of the at least one characteristic point of the to-be-identified fingerprint on the display apparatus.

In Step S103, a local image of the at least one fingerprint characteristic point may be obtained by controlling a first number of the plurality of fingerprint identification pixels to emit light according to the position coordinate. The first number may be smaller than, or equal to a total number of the fingerprint identification pixels in the fingerprint identification region.

In one embodiment, the Step S103 may include determining a first light-emitting region corresponding to the position coordinate; and controlling the fingerprint identification pixels in the first light-emitting region to emit light. The first light-emitting region may be a portion of the fingerprint identification region; and may cover the point determined by the position coordinate.

In another embodiment, the Step S103 may include determining a second light-emitting region corresponding to the position coordinate; and controlling the fingerprint identification pixels in the second light-emitting region to emit light. The second light-emitting region may be a portion of the fingerprint identification region; and may surround the point determined by the position coordinate.

In another embodiment, the Step S103 may include determining a third light-emitting region corresponding to the position coordinate; and controlling the fingerprint identification pixels in the third light-emitting region to emit light according to a bit shift of a first point matrix. The third light-emitting region may be a portion of the fingerprint identification region; and may cover the point determined by the position coordinate. The distance between any two adjacent fingerprint identification pixels of the first point matrix may be greater than, or equal to a minimum no-crosstalk distance. The minimum no-crosstalk distance may be referred to a maximum radius of a covered region formed on a fingerprint identification matrix by the light reflected by the touching body after being emitted from any fingerprint identification pixel.

In Step S104, the to-be-identified fingerprint may be identified according to the local images.

In one embodiment, as shown in FIG. 16, the display apparatus may include a display panel 100, a fingerprint identification substrate 300 and a fingerprint identification light source FL. The display panel 100 may have a light-emitting side and a non-light-emitting side. The fingerprint identification substrate 300 may be disposed at the non-light-emitting side of the display panel 100.

The Step S101 may include controlling the fingerprint light-emitting source FL to emit light to obtain the whole image.

In one embodiment, the Step S101 may include controlling the fingerprint identification pixels in the fingerprint identification region to emit light to obtain the whole image of the to-be-identified fingerprint.

Further, in one embodiment, in the Step S101 and the Step S103, the brightness of the light emitted from the fingerprint identification pixels during obtaining the whole image is smaller than the brightness of the light emitted from the fingerprint identification pixels during obtaining the local images.

Further, in one embodiment, in the Step S101 and the Step S103, the light-emitting time duration of the fingerprint identification pixels during obtaining the whole image is shorter than the light-emitting time duration of the fingerprint identification pixels during obtaining the local images.

In the disclosed embodiments, during the fingerprint identification process, the whole image of the fingerprint may be obtained first. The positions of the fingerprint characteristic points of the may be identified according to the whole image. The fingerprint identification pixels may be controlled to emit light according to the identified positions to obtain the local images at the positions corresponding to the fingerprint characteristic points. Then, the information of the fingerprint characteristic points may be obtained according to the local images with an improved accuracy. Thus, through using the local images to perform the fingerprint identification process, the effects of the dry finger issue and the light crosstalk issue on the fingerprint identification accuracy may be reduced. Thus, the fingerprint identification accuracy of the display apparatus may be increased.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A display apparatus, comprising:
a display region including a fingerprint identification region and a non-display region surrounding the display region;
a plurality of fingerprint identification pixels, disposed in the fingerprint identification region and configured to provide fingerprint identification light; a fingerprint identification array including a plurality of fingerprint sensing units, disposed in the fingerprint identification region and configured to receive the fingerprint identification light after being reflected by a touching body; and
a controller electrically connected to the plurality of fingerprint sensing units, wherein the controller is configured to: obtain a whole image of a to-be-identified fingerprint, according to the whole image, determine a position coordinate of at least one characteristic point of the to-be-identified fingerprint on the display apparatus, according to the position coordinate, control a first number of the plurality of fingerprint identification pixels to emit light to obtain a local image at the at least one characteristic point of the to-be-identified fingerprint, and identify the to-be-identified fingerprint according to the local image, wherein the first number of the plurality of fingerprint identification pixels is smaller than a total number of the plurality of fingerprint identification pixels;
wherein: when the controller is configured to obtain a whole image of a to-be-identified fingerprint, the controller is further configured to: control all the fingerprint identification pixels in the fingerprint identification region to emit light:
the local image is obtained after the whole image is obtained; and
the first number of the plurality of fingerprint identification pixels are located in an area with a preset threshold radius around the position coordinates of the at least one characteristic point of the to-be-identified fingerprint on the display apparatus.

2. The display apparatus according to claim 1, wherein when the controller is configured to control a first number of the plurality of fingerprint identification pixels to emit light according to the position coordinate, the controller is further configured to:
determine a first light-emitting region corresponding to the position coordinate of the at least one characteristic point of the to-be-identified fingerprint; and
control the first number of the plurality of fingerprint identification pixels in the first light-emitting region to emit light,
wherein the first light-emitting region is a portion of the fingerprint identification region and covering a point determined by the position coordinate.

3. The display apparatus according to claim 2, wherein:
the first light-emitting region is a circular region;
a center of the circular region is the position coordinate; and
a radius of the circular region is a first preset threshold value.

4. The display apparatus according to claim 1, wherein when the controller is configured to control a first number of the plurality of fingerprint identification pixels to emit light according to the position coordinate, the controller is further configured to:
determine a second light-emitting region corresponding to the position coordinate; and
control the first number of the plurality of fingerprint identification pixels in the second light-emitting region to emit light,
wherein the second light-emitting region is a portion of the fingerprint identification region and is surrounding a point determined by the position coordinate.

5. The display apparatus according to claim 4, wherein:
the second light-emitting region is a ring region;
a center of the ring region is the position coordinate;
an inner radius of the ring region is a first preset threshold value; and
an outer radius of the ring region is a second preset threshold value.

6. The display apparatus according to claim 4, wherein:
in the fingerprint identification region, a region where the whole image is located in is a fingerprint region;
the second light-emitting region is a region in the fingerprint region excluding a circular region with a center of the position coordinate and a radius of a first present value.

7. The display apparatus according to claim 1, wherein when the controller is configured to control a first number of the plurality of fingerprint identification pixels to emit light according to the position coordinate, the controller is further configured to:
determine a third light emitting region; and
control the first number of the plurality of fingerprint identification pixels in the third light-emitting region to emit light according to a bit shift of a first point matrix, wherein:
the third light-emitting region is a portion of the fingerprint identification region and is covering a point determined by the position coordinate; and
a distance between any two adjacent fingerprint identification pixels in the first point matrix is greater than, or equal to a minimum no-crosstalk distance.

8. The display apparatus according to claim 1, further comprising:
a display panel having a light-emitting side and a non-light-emitting side;
a fingerprint identification substrate disposed at the non-light-emitting side of the display panel, wherein the fingerprint identification substrate has a first side adjacent to the display panel and a second side opposite to the display panel; and
a fingerprint identification light source, disposed on the first side of the fingerprint identification substrate and configured to provide the fingerprint identification light for the controller to obtain the whole image.

9. The display apparatus to claim 1, wherein: a brightness of the light emitted from a fingerprint identification pixel during obtaining the whole image by the controller is smaller than a brightness of the light emitted from the fingerprint identification pixel during obtaining the local image by the controller.

10. The display apparatus according to claim 1, wherein: a light-emitting time duration of a fingerprint identification pixel during obtaining the whole image by the controller is smaller than a light-emitting time, duration of the fingerprint identification pixel during obtaining the local image by the controller.

11. The display apparatus according to claim 1, wherein the display region comprises:
a plurality of display pixels configured to display images during a display stage,
wherein a display pixel is multiplexed as a fingerprint identification pixel during a fingerprint identification stage.

12. The display apparatus according to claim 1, wherein the display region comprises:
a plurality of display pixels configured to display images, wherein in the fingerprint identification region, the display pixels are interlaced with the fingerprint identification pixels, and a display pixel is not overlapped with a fingerprint identification pixel.

13. The display apparatus according to claim 1, wherein: the at least one characteristic point of the to-be-identified fingerprint comprises at least one of ending ridge, bifurcation, enclosure, short ridge, island, spur and ridge crossing.

14. A fingerprint identification method for a display apparatus comprising a display region including a fingerprint identification region and a non-display region surrounding the display region, and a plurality of fingerprint identification pixels disposed in the fingerprint identification region and configured to provide fingerprint identification light, the fingerprint identification method comprising:
obtaining a whole image of a to-be-identified fingerprint;
wherein: when obtaining a whole image of a to-be-identified fingerprint, controlling, by the controller, all the fingerprint identification pixels in the fingerprint identification region to emit light;
obtaining the local image after the whole image being obtained;
according to the whole image, determining a position coordinate of at least one characteristic point of the to-be-identified fingerprint on the display apparatus;
according to the position coordinate, controlling a first number of the plurality of fingerprint identification pixels to emit light to obtain a local image at the at least one characteristic point of the to-be-identified fingerprint; and according to the local image, identifying the to-be-identified fingerprint; and
wherein the first number of the plurality of fingerprint identification pixels are located in an area with a preset threshold radius around the position coordinates of the at least one characteristic point of the to-be-identified fingerprint on the display apparatus.

15. The fingerprint identification method according to claim 14, wherein according to the position coordinate, controlling a first number of the plurality of fingerprint identification pixels to emit light further comprises:
determining a first light-emitting region corresponding to the position coordinate, wherein the first light-emitting region is a portion of the fingerprint identification region and is covering a point determined by the position coordinate; and
controlling the first number of the plurality of fingerprint identification pixels in the first light-emitting region to emit light.

16. The fingerprint identification method according to claim 14, according to the position coordinate, controlling a first number of the plurality of fingerprint identification pixels to emit light further comprises:
determining a second light-emitting region corresponding to the position coordinate, wherein the second light-emitting region is a portion of the fingerprint identification region and is surrounding a point determined by the position coordinate; and
controlling the first number of the plurality of fingerprint identification pixels in the second light-emitting region to emit light.

17. The fingerprint identification method according to claim 14, wherein according to the position coordinate, controlling a first number of the plurality of fingerprint identification pixels to emit light further comprises:
determining a third light-emitting region corresponding to the position coordinate, wherein the third light-emitting region is a portion of the fingerprint identification region and covering a point determined by the position coordinate; and
according to a bit shift of a first light-emitting point matrix, controlling the first number of the plurality of fingerprint identification pixels in the third light-emitting region to emit light,
wherein:
a maximum radius of a covered region, which is disposed on the fingerprint identification array and formed by light emitted from any one of the plurality of fingerprint identification pixel after being reflected by a touching body, is referred to as a minimum no-crosstalk distance, and
a distance between any two adjacent fingerprint identification pixels in the first point matrix is greater than or equal to the minimum no-crosstalk distance.

18. The fingerprint identification method according to claim 14, wherein the display apparatus further comprises a display panel having a light-emitting side and a non-light-emitting side, a fingerprint identification substrate disposed at the non-light-emitting side of the display panel, wherein the fingerprint identification substrate has a first side adjacent to the display panel and a second side opposite to the display panel, a fingerprint identification light source disposed on the first side of the fingerprint identification substrate, obtaining a whole image of a to-be-identified fingerprint further comprises:
controlling the fingerprint identification light source to emit light to obtain the whole image of the to-be-identified fingerprint.

19. The fingerprint identification method according to claim 14, wherein obtaining a whole image of a to-be identified fingerprint further comprises:
controlling all the fingerprint identification pixels in the fingerprint identification region to emit light to obtain the whole image of the to-be-identified fingerprint.

* * * * *